April 30, 1968   M. A. SULLIVAN   3,380,403
PALLET
Filed March 13, 1967
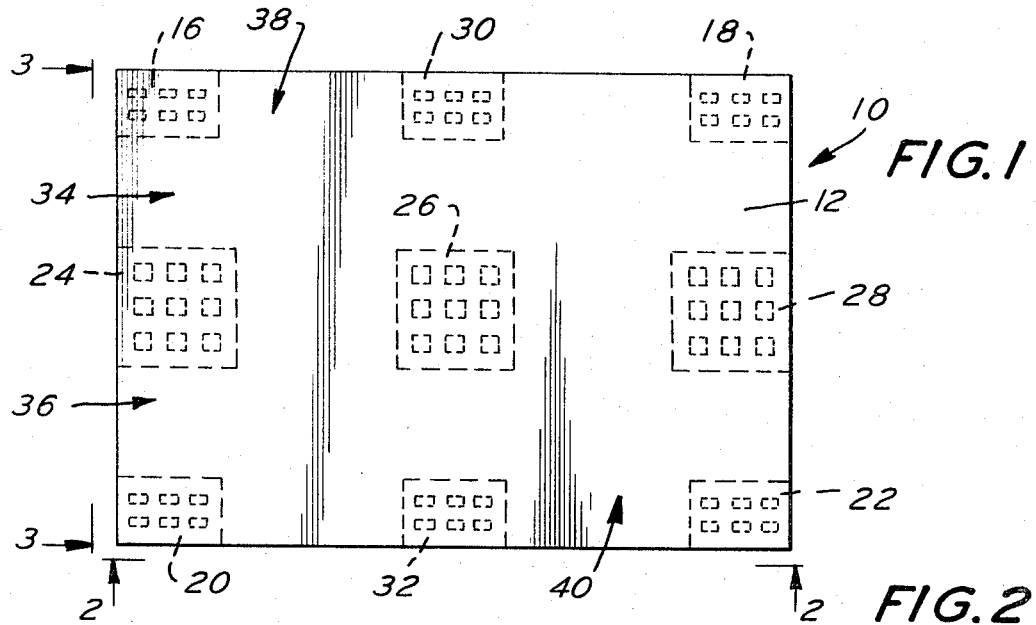
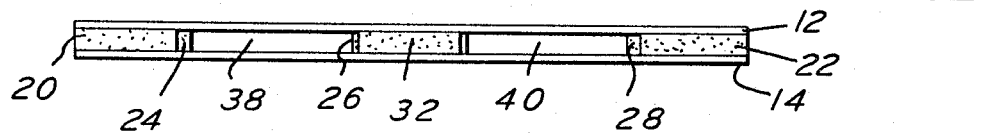
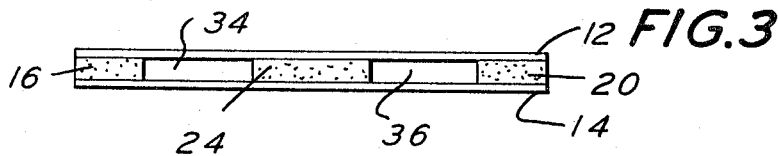
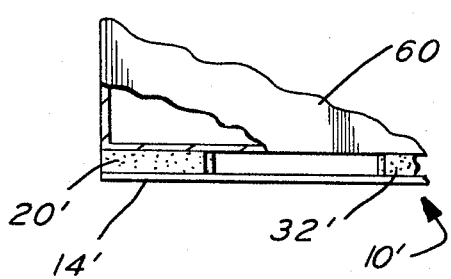
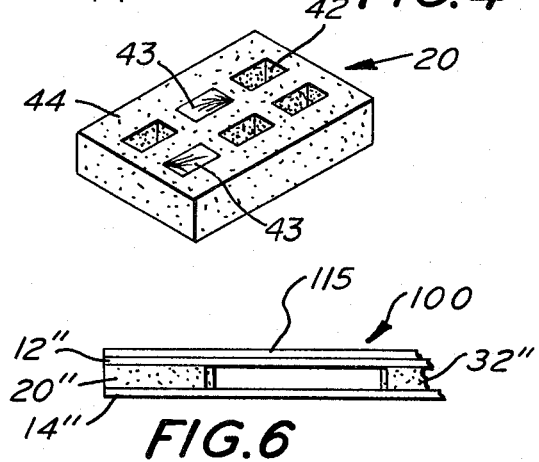
INVENTOR
MATTHEW A. SULLIVAN
BY
ATTORNEYS.

United States Patent Office 3,380,403
Patented Apr. 30, 1968

3,380,403
PALLET
Matthew Andrew Sullivan, Elkins Park, Pa., assignor to Sullifoam, Incorporated, Willow Grove, Pa., a corporation of Pennsylvania
Filed Mar. 13, 1967, Ser. No. 622,808
4 Claims. (Cl. 108—51)

ABSTRACT OF THE DISCLOSURE

An expendable pallet is provided having spaced apertured blocks of rigid foam polymeric material bonded to a layer of corrugated paperboard or sandwiched between layers of such paperboard.

---

This invention relates to an expendable pallet. Heretofore, pallets have been made from wood. The pallet of the present invention has a weight of approximately twenty percent of the weight of a wooden pallet. The pallet of the present invention is capable of being manufactured faster and cheaper than wooden pallets. Pallets in accordance with the present invention are inexpensive and are primary for a single use.

In industries where a large number of pallets are utilized, and the pallets are made from wood, the pallets present a substantial problem. Because of the weight of the wooden pallets, transportation is a substantial factor. The pallets of the present invention are made from materials which are light in weight and capable of being readily consumed by shredders and then baling the shredded material in the form of bales. The pallets of the present invention occupy a substantially smaller amount of space as compared with wooden pallets. The pallets of the present invention can be manufactured with a mimimum of investment since they require no special tools.

In accordance with the present invention, the expendable pallets have spaced apertured blocks of rigid foam polymeric material bonded to a layer of corrugated paperboard or sandwiched between layers of such paperboard. The blocks of rigid foam polymeric material are preferably provided with a plurality of holes extending therethrough. The provision of such holes has a double advantage. Thus, the provision of such holes enables the blocks to be molded more consistently and provides for more uniform heat distribution so that the blocks may be molded at a faster cycle as compared with solid blocks. In addition, the holes will trap air when sandwiched between layers of paperboard and thereby offer resistance to crushing under the load supported thereon.

It is an object of the present invention to provide a novel expendable pallet.

It is another object of the present invention to provide an expendable pallet which is light in weight and inexpensive to manufacture while requiring no special tooling.

It is another object of the present invention to provide an expendable pallet which is light in weight and inexmeric material constructed in a manner so as to facilitate more consistent molding at faster cycles as compared with solid blocks.

It is another object of the present invention to provide a pallet constructed in a manner so that it can be disposed of after a single use by shredding and baling the same.

Other objects will appear hereinafter.

For the purpose of illustrating the invention, there is shown in the drawings a form which is presently preferred; it being understood, however, that this invention is not limited to the precise arrangements and instrumentalities shown.

FIGURE 1 is a top plan view of the pallet of the present invention.

FIGURE 2 is a side elevation view taken along the line 2—2 in FIGURE 1.

FIGURE 3 is an end elevation view taken along the line 3—3 in FIGURE 1.

FIGURE 4 is a perspective view of one of the blocks of rigid foam polymeric material.

FIGURE 5 is a partial side elevation view of another embodiment of the present invention wherein the blocks of rigid foam polymeric material are bonded to a single layer of corrugated paperboard.

FIGURE 6 is a partial side elevation view of another embodiment of the present invention wherein the top layer of corrugated paperboard is a double wall paperboard.

Referring to the drawing in detail, wherein like numerals indicate like elements, there is shown in FIGURE 1 a pallet designated generally as 10. The pallet 10 may be of any size desired. The pallet 10 includes a top layer of corrugated paperboard 12 and a bottom layer of corrugated paperboard 14.

The layers 12 and 14 are superimposed over one another and are bonded to the opposite faces of a plurality of longitudinally and laterally spaced blocks of rigid foam polymeric material 16, 18, 20, 22, 24, 26, 28, 30, and 32. Such blocks are preferably made from foam polystyrene. Blocks 16, 18, 20 and 22 are disposed at the corners of the pallet. Blocks 16, 30, and 18 form a row along one side of the pallet 10. Blocks 20, 32, and 22 form a row along the opposite side of the pallet. A central row of blocks is formed by blocks 24, 26, and 28.

Channels 34, 36, 38 and 40 are provided so that the prongs of a fork lift truck may be inserted thereinto to facilitate lifting and transferring a loaded pallet. The opposite faces of the blocks are adhesively bonded to the inner surfaces of the layers 12 and 14 by any suitable adhesive desired such as a commercially available rubber base adhesive. It will be noted that the top and bottom surfaces of the blocks have a surface area which is substantially larger than the surface area of any of the side or end faces of the blocks. In this manner, maximum support for the layers 12 and 14 of corrugated paperboard is provided.

Each of the blocks is provided with holes extending therethrough. As shown more clearly in FIGURE 4, block 20 is provided with six holes extending therethrough from the top and bottom faces. Blocks 16, 30, 18, 22, and 32 are identical with block 20. Blocks 24, 26, and 28 are identical with block 20 except that they are larger and have a larger number of holes extending therethrough. For example, as shown in FIGURE 1, the blocks 24, 26, and 28 will have nine holes extending therethrough.

The holes 42 in block 20, for example, enable the block 20 to be more consistently molded due to the holes providing for more uniform heat distribution. As a result thereof, the blocks may be molded at a faster cycle rate than if the blocks were solid. It is desirable to mold the blocks since molding will provide a smooth surface finish. If the blocks are cut to size, a rough surface is presented requiring about 50% more glue for bonding the blocks to layers 12 and 14. When the blocks are sandwiched between layers of corrugated paperboard, as illustrated in FIGURES 1–3, air is trapped in the holes. As a result thereof, the blocks offer more resistance to crushing forces since the air will tend to be compressed as the force increases. The compressing of the air in the holes will resist deformation of the blocks.

A pallet in accordance with the present invention weighed only three pounds as compared with a conventional pallet made from wood which weighed fifteen pounds. It will be obvious to those skilled in the art that the weight of the pallet will vary with the size of the pallet. These figures are based on a pallet sixty inches long and forty inches wide.

It will be noted that if the pallet 10 is positioned on a floor which is wet, the blocks of polymeric material will not transmit moisture by osmosis from the layer 14 to the layer 12. If a nail or other sharp surface is sticking up from the floor, the pallet 10 may be positioned over the same without any substantial damage to it. That is, a sharp object such as a nail could pierce the layer 14 and enter one of the blocks without doing any substantial damage to the pallet 10.

The pallet 10 of the present invention can be tailored to fit many different situations and conditions. As shown in FIGURE 5, the pallet 10' is identical with the pallet 10 except as will be made clear hereinafter. Hence, corresponding primed numerals are provided. The pallet 10' does not have a layer corresponding to layer 12. Otherwise pallet 10' is identical with pallet 10. Pallet 10' does have some usage which does not require both a top and bottom layer of corrugated paperboard. Thus, pallet 10' could be used for support and movement of products within a building or between closely adjacent buildings. As illustrated, adhesive has been applied to the exposed upper surface of the rigid foam blocks so that pallet 10' can be adhesively joined to the lower surface of a carton or container 60 for a product such as a refrigerator.

In FIGURE 6, there is illustrated another pallet designated generally as 100. Pallet 100 is identical with pallet 10 except as will be made clear hereinafter. Accordingly, corresponding elements are provided with corresponding double-primed numerals. Pallet 100 differs from pallet 10 by the use of double wall corrugated paperboard as the top layer. Thus, a second layer of corrugated paperboard 115 is adhesively bonded to the layer 12". Such a pallet provides for supporting heavier loads than pallet 10. Otherwise, pallet 100 is identical with pallet 10.

Pallets 10, 10' and 100 are capable of being utilized on conveyor belts and chains. Each of the pallets of the present invention are comprised of corrugated paperboard, foam polymeric material and adhesive. Accordingly, the pallets may be shredded and baled in the same manner that paper and paperboard are disposed of at the present time.

I have found that suitable dimensions for block 20 and those identical thereto are 2 x 6 x 10 inches, with holes 42 being 1 x 2 inches. Thus, the area of surface 44 is 48 square inches. I have found that suitable dimensions for block 24 and those identical therewith are 2 x 10 x 10 inches with holes therein being 2 x 2. Thus, the area of the top surface on block 24 is 64 square inches. If maximum compressive strength is desired, some of the holes in blocks 24–28 may be filled by small blocks of wood 43 having dimensions such as 2 x 1¾ x 1¾ inches. Other dimensions may be used for the blocks so long as the major area is on a face joined to a layer of corrugated paperboard. It should be noted that block 24 would have a size of 8 x 8 inches rather than 10 x 10 inches if the block did not have holes therethrough while having the same surface area of 64 square inches and made solid. As illustrated, blocks 24–28 distribute the load over a larger surface for more even distribution.

While a wide variety of polystyrene molding material is commercially available, I prefer to use "Dylite" (Reg. T.M.) which has the following properties:

Thermal conductivity—0.242 at 75° F. mean temperature
Density—2 lbs. per cu. ft.
Shock resistance—theoretical energy absorption of 60–70 lbs./sq. inch
Compressive strength—30 p.s.i.
Tensile strength—50 p.s.i.
Water absorption—less than .9% during 48 hours The present invention may be embodied in other specific forms without departing from the spirit or essential attributes thereof and, accordingly, reference should be made to the appended claims, rather than to the foregoing specification as indicating the scope of the invention.

I claim:

1. An expendable pallet comprising a first layer of corrugated paperboard, a plurality of spaced molded blocks of rigid foam polymeric material, said blocks having a smooth major top and bottom face thereon, the bottom face of said blocks being bonded to said first layer of corrugated paperboard, one of said blocks overlying each corner portion of said first layer of corrugated paperboard, each of said blocks having a plurality of apertures extending therethrough from said top face to said bottom face so that the area of said bottom face juxtaposed to said first layer of corrugated paperboard is substantially larger than if the blocks were solid and made from the same amount of material, the top and bottom faces of said blocks encompassing a substantially greater total area than the combined area of the sides and end faces of said blocks, said top face and said bottom face of said blocks having substantially the same configuration and encompassing substantially the same total area, and said blocks being arranged so as to provide channels between rows of blocks for receiving the tines of a lifting vehicle, wherein air is trapped in at least some of said apertures so that the blocks offer resistance to crushing forces since the air will tend to be compressed as the crushing forces increase thereby resisting deformation of the blocks.

2. An expendable pallet in accordance with claim 1 including a block of wood in other of said apertures, said wood blocks being of substantially the same size but slightly smaller than the apertures within which they are placed, said wood blocks being provided to resist deformation of the molded blocks of foam polymeric material.

3. An expendable pallet as set forth in claim 1 including a second layer of corrugated paperboard, said blocks being sandwiched between said first and second layers of corrugated paperboard and adhesively bonded to each of said layers, wherein the top face of said blocks is bonded to said second layer of corrugated paperboard.

4. An expendable pallet in accordance with claim 1 including a row of blocks having surface area substantially greater than the remaining blocks to provide a larger surface thereby resulting in more even load distribution.

References Cited

UNITED STATES PATENTS

| | | | |
|---|---|---|---|
| 2,493,562 | 1/1950 | Yarman | 108—58 |
| 2,583,443 | 1/1952 | Perry et al. | 108—57 |
| 2,673,052 | 3/1954 | Risch. | |
| 2,996,276 | 8/1961 | Sorensen et al. | 108—57 |
| 3,079,876 | 3/1963 | Doane | 108—56 |
| 3,104,085 | 9/1963 | Skladany | 108—51 X |
| 3,275,131 | 9/1966 | Erickson | 108—51 |
| 3,302,593 | 2/1967 | Roberts | 108—56 |

BOBBY R. GAY, *Primary Examiner.*

G. O. FINCH, *Assistant Examiner.*